W. E. GILROY.
CHECK ROW CORN PLANTER.
APPLICATION FILED MAY 6, 1911.

1,103,357.

Patented July 14, 1914.
4 SHEETS—SHEET 1.

W. E. GILROY.
CHECK ROW CORN PLANTER.
APPLICATION FILED MAY 6, 1911.

1,103,357.

Patented July 14, 1914.
4 SHEETS—SHEET 2.

Witnesses.

Inventor.
W. E. Gilroy
Attorney.

W. E. GILROY.
CHECK ROW CORN PLANTER.
APPLICATION FILED MAY 6, 1911.
1,103,357.
Patented July 14, 1914.
4 SHEETS—SHEET 3.
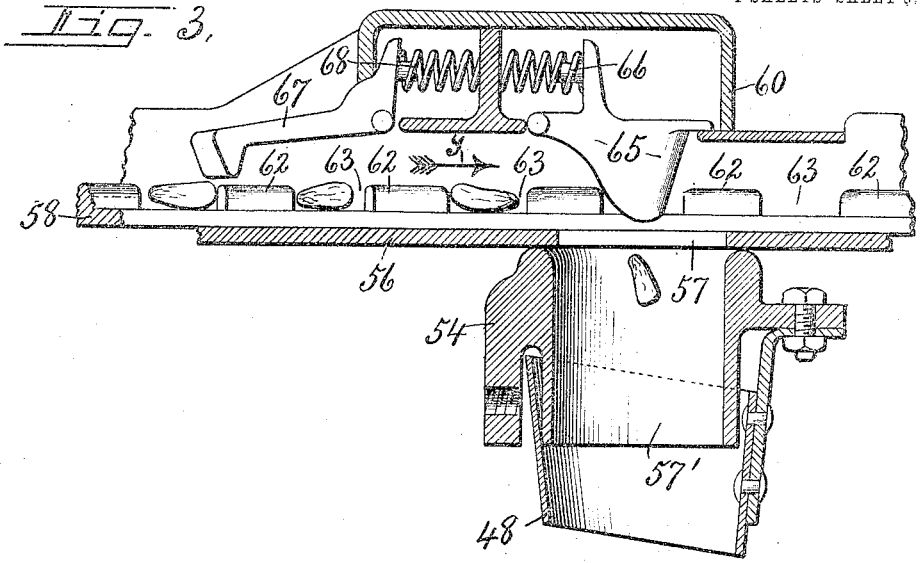
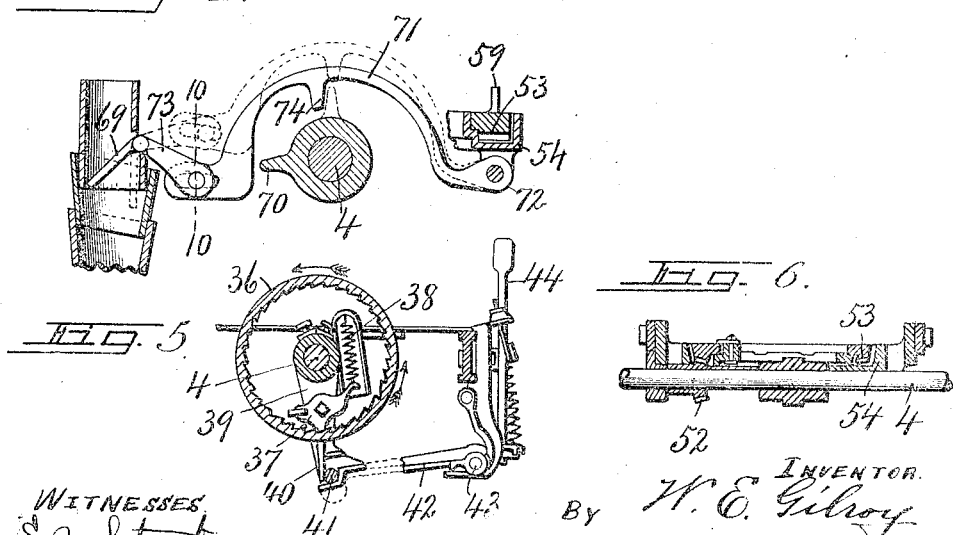
WITNESSES
INVENTOR
W. E. Gilroy
BY
Howard P. Denison
ATTORNEY.

W. E. GILROY.
CHECK ROW CORN PLANTER.
APPLICATION FILED MAY 6, 1911.

1,103,357.

Patented July 14, 1914.
4 SHEETS—SHEET 4.

WITNESSES
Chas. B. Skelton
H. E. Chas

INVENTOR
W. E. Gilroy
BY
Howard Grimshaw
ATTY.

UNITED STATES PATENT OFFICE.

WILLIAM E. GILROY, OF UTICA, NEW YORK, ASSIGNOR TO EUREKA MOWER COMPANY, OF UTICA, NEW YORK, A CORPORATION OF NEW YORK.

CHECK-ROW CORN-PLANTER.

1,103,357.

Specification of Letters Patent.

Patented July 14, 1914.

Original application filed October 16, 1908, Serial No. 458,088. Divided and this application filed May 6, 1911. Serial No. 625,477.

*To all whom it may concern:*

Be it known that I, WILLIAM E. GILROY, of Utica, in the county of Oneida, in the State of New York, have invented new and useful Improvements in Check-Row Corn-Planters, of which the following, taken in connection with the accompanying drawings, is a full, clear, and exact description.

This invention relates to certain improvements in check row corn planters and refers more particularly to mechanisms for controlling the feed of the corn and fertilizer as set forth in my pending application No. 458,088, filed October 16, 1908, and patented March 5, 1912, #1,019,038 of which this application is a division.

One of the specific objects is to provide a more effective means for automatically depositing a predetermined number of seeds or kernels in each hill and also to permit the number of kernels so deposited to be readily varied at will.

A further object is to control the feed of corn and fertilizer in such manner that the fertilizer will be deposited directly under and at opposite sides of the corn deposit so as to more effectively fertilize each hill of corn.

Other objects and uses relating to the feeding of the corn and fertilizer will be brought out in the following description.

Figure 1:
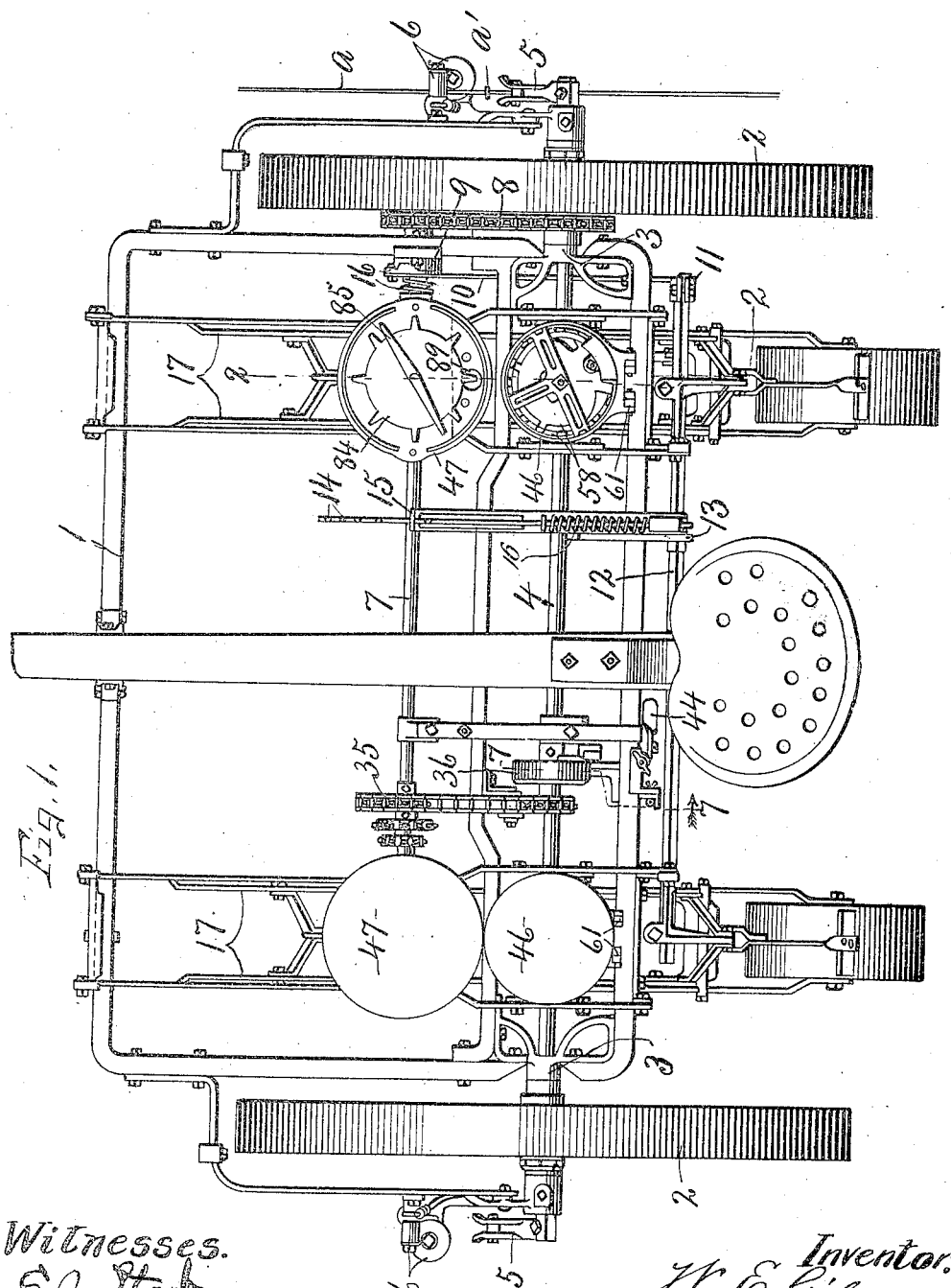
Figure 2:
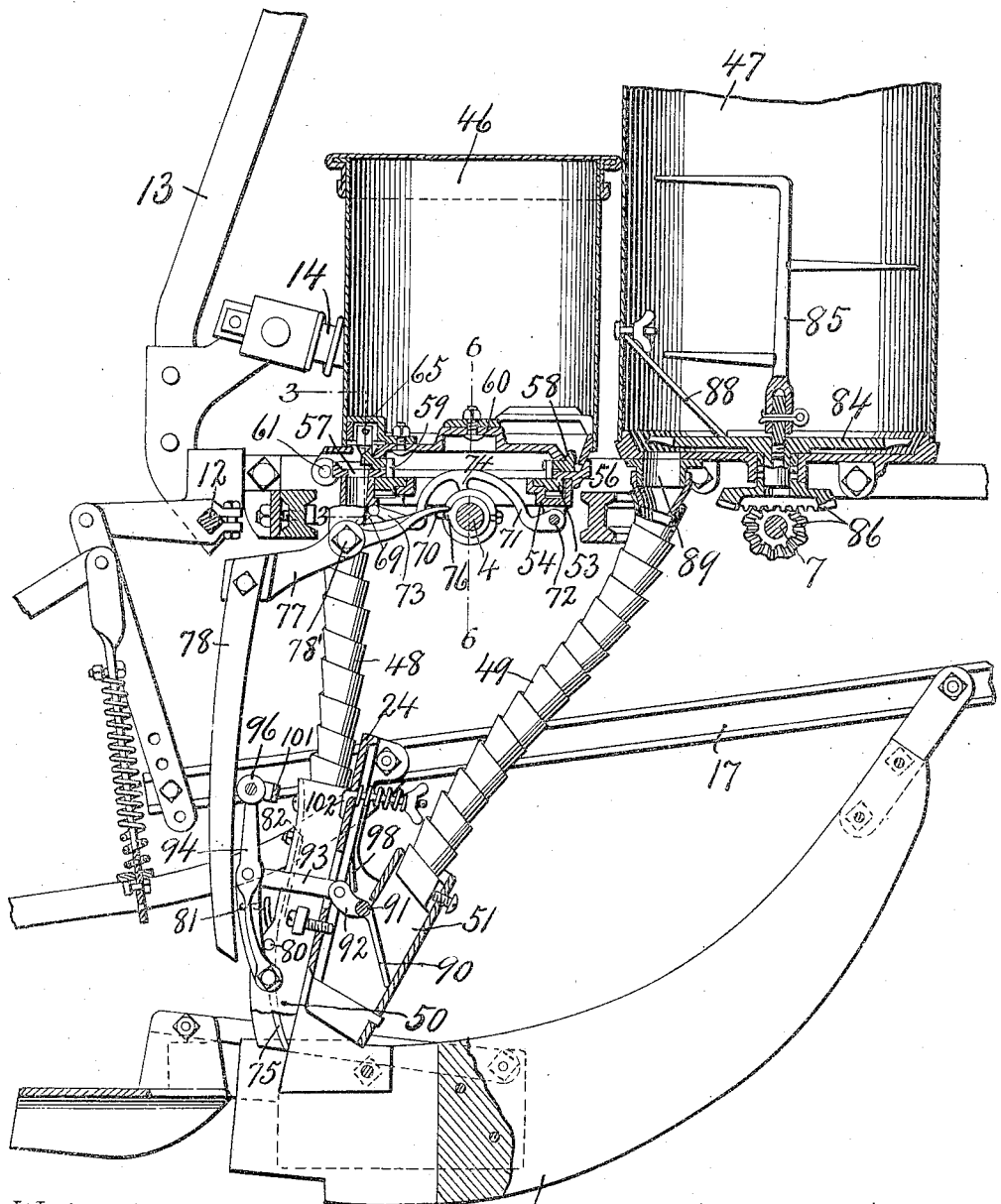
Figure 7:
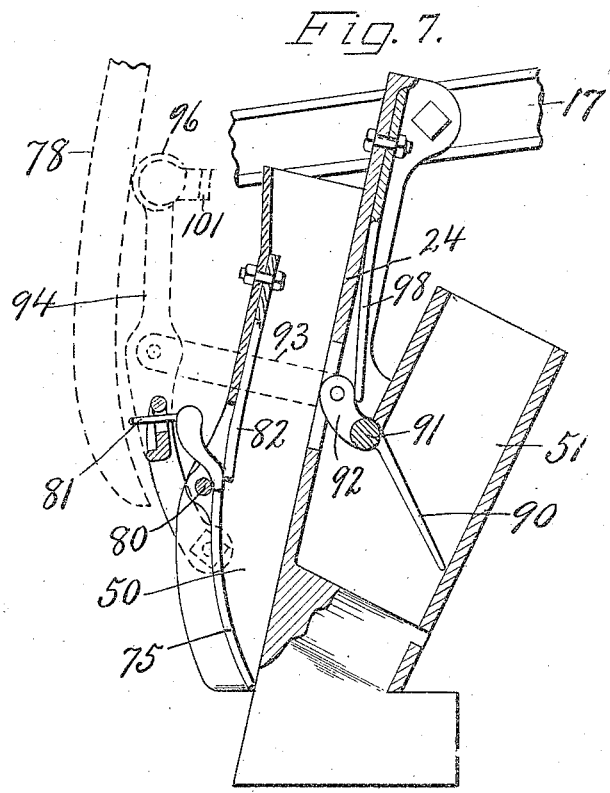
Figure 8:
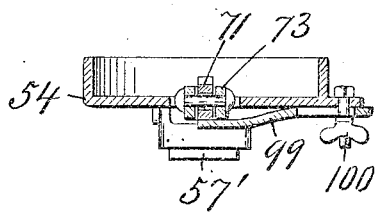

In the drawings: Figure 1 is a top plan of a check row corn planter embodying the various features of my invention and showing a portion of a check wire with which the machine is adapted to coact. Fig. 2 is an enlarged transverse sectional view taken on line 2—2, Fig. 1 except that portions of the corn and fertilizer chutes are shown in elevation and the upper portion of the fertilizer receptacle is broken away. Fig. 3 is an enlarged section view of a portion of one of the seed separating mechanisms at the base of one of the corn hoppers shown in Fig. 2 together with the upper portion of the adjacent chute on line 3—3 of Fig. 2. Fig. 4 is an enlarged sectional view of the upper portion of one of the corn chutes showing the adjacent valve and its operating means. Fig. 5 is a transverse sectional view through the check-shaft and its driving disk taken on line 7—7, Fig. 1. Fig. 6 is a detail sectional view of the seed feeding disk and its driving connection with the check-shaft on the line 6—6 of Fig. 2. Fig. 7 is an enlarged vertical sectional view through the lower ends of the corn and fertilizer chutes showing particularly the valves and their controlling mechanisms. Fig. 8 is a detail sectional view taken on line 10—10, Fig. 4 showing particularly the means for holding the upper corn controlling valve in its open position and also showing a part of the supporting base for the corn hopper.

This machine comprises a main frame —1— having suitable landwheels —2— and is adapted to be drawn or propelled by any available power lengthwise of a check wire —a— which is operatively connected to one side of the machine in a manner hereinafter described and is provided with the usual check-stops —a′— for controlling the operation of the seed and fertilizer feeding mechanism and other parts of the machine.

The frame —1— is of sufficient length and width to receive and support duplicate sets of the seed and fertilizer feeding mechanisms and corresponding furrow openers wholly between the wheels and is provided with tubular axle stubs —3— upon which the wheels —2— are journaled and through which is extended a continuous check shaft —4— having its opposite ends provided with furcated crank arms —5— for coöperative engagement with the check stops a′ whereby the check-shaft is caused to rotate intermittingly one complete revolution at a time. The check wire may be held and guided in operative relation to the correlated crank-arm —5— by any suitable device as —6— which is also capable of being easily manipulated at will to release or disconnect the wire from the machine when necessary.

A counter shaft —7— is mounted in suitable bearings upon the main frame —1— some distance in front of and parallel with the check-shaft —4— and is adapted to be rotated continuously by one of the land wheels —2— through the medium of a sprocket chain —8— and a clutch —9— while the machine is in operation for depositing the seeds and fertilizer.

The clutch —9— may be of any well known construction capable of being operated at will to connect and disconnect the counter shaft to and from its driving wheel and for this purpose one of its sections is connected by a link —10— to a crank arm —11— on a rock shaft —12— which is journaled in suitable bearings on the main frame —1— at the rear of and parallel with the check shaft —4—.

The rock shaft —12— is provided with a suitable operating lever —13— carrying a notched pawl —14— for interlocking engagement with a fixed stop shoulder —15— on the main supporting frame to hold the clutch in its inoperative position against the action of a retracting spring —16—, thereby permitting the wheels to revolve freely on their axle stubs when the machine is drawn over the surface of the ground without operating any of the other mechanisms.

When the machine is in operation for feeding the seeds and fertilizer, the check row shaft is caused to rotate intermittingly one revolution at a time as each check stop on the check wire is encountered by the coacting forked arm —5— and for this purpose the continuously rotating counter shaft —7— is connected by a link belt —35— to a ratchet wheel —36— which is loose on the check shaft —4— but is adapted to be intermittingly locked to said check shaft by means of a pawl —37— which is forced into engagement with the internal teeth of the ratchet wheel —36— by a spring —38— as the check shaft —4— is initially moved by contact of the furcated arm —5— with one of the stops —a'— on the check wire —a—.

The pawl —37— is pivoted to a crank arm —39— on the check shaft —4— so as to rotate bodily therewith and is provided with a pendant arm —40— extending beyond the periphery of the ratchet wheel —36— for engaging a limiting stop or pin —41— and thereby tripping the pawl and normally holding it out of engagement with the teeth of the ratchet wheel except when the check shaft is initially operated. Now, when the forked arm —5— engages one of the check stops —a'—, the check shaft will be rotated in the direction indicated by the arrows in Fig. 5 thereby rotating the pawl bodily with the arm —39— and causing a pendant arm —40— of the pawl to ride over the pin —41— against the action of the spring —38— until such pawl is free from engagement with the pin, whereupon it is instantly forced into engagement with the teeth of the ratchet wheel by the spring —38—, thereby locking said ratchet wheel to the check shaft and allowing said check shaft to be rotated a complete revolution by the link belt —35— until the pendant arm —40— is again brought into contact with the stop pin —41— to trip the pawl and thereby disconnect the ratchet wheel from its shaft —4— this operation being repeated as often as the forked arm —5— encounters one of the check stops —a'— as the machine is drawn lengthwise of the wire —a—. This intermitting action is utilized to operate the seed feeding and fertilizer distributing mechanisms for depositing the seeds and fertilizer in hills or in some instances it may be desired to deposit the seed and fertilizer in drills or continuously in the furrow and for this purpose the stop pin —41— is mounted upon a horizontally movable arm —42— which is supported upon a guide rod —43— and is adapted to be shifted laterally by any suitable means as a hand or foot lever —44— shown in Figs. 1 and 5 to force the pin —41— out of the path of movement of the trip arm —40— of the pawl, thus allowing the pawl to remain in interlocking engagement with the teeth of the ratchet wheel for continuous rotation of the check shaft which controls the action of the seed feeding and fertilizer distributing mechanisms hereinafter described.

*Seed feeding and fertilizer distributing mechanisms.*—These mechanisms are preferably duplicated one for each of the furrow openers or plows 22 and each comprising a seed reservoir —46— and fertilizer reservoir —47— and suitable devices for feeding limited quantities of the seeds and fertilizer to points directly under the check shaft and between the rearwardly diverging wings of the furrow openers. These reservoirs are rigidly mounted one in advance of the other upon the main supporting frame —1— directly over the check row shaft —4— and counter shaft —7— respectively and are connected by separate flexible chutes —48— and —49— to downwardly converging valve chambers or extensions —50— and —51— on the bracket —24—.

*Corn feeding mechanism.*—Secured to the check shaft —4— directly under the seed reservoir —46— is a pinion or gear —52— meshing with a circular toothed rack —53— which is rotatably seated in a fixed supporting rim —54— on the main supporting frame —1— directly under the lower end of the reservoir or hopper —46— and preferably concentric therewith as best seen in Figs. 1, 2 and 6. This toothed rack is held against upward displacement by a superposed fixed ring —56— which is also secured to the frame —1— and is provided with an outlet opening —57— in the rear side thereof registering with a similar outlet —57'— in the underlying fixed plate —54— just at the rear of the toothed rack —53—, said outlet —57'— being connected directly to the upper ends of the chute —48— as best seen in Figs. 2 and 3. Directly above and resting upon the upper surface of the fixed ring or plate —56— is a rotary corn feeding and spacing ring —58— which is operatively connected to the toothed rack or ring —53— by suitable lugs —59— extending upwardly just inside of the opening in the fixed ring —56— as best seen in Fig. 2 so as to transmit rotary motion from the toothed rack to the seed feeding plate —58—. Directly above and bearing against the upper face of the seed feeding ring —58— is an additional non-rotatable ring or plate —60— which together with the ring —56— are hinged at —61— at their rear edges to the main supporting frame to permit access to the rotating rings —53— and —58— and also to permit said rotating elements to be removed or replaced at will.

The corn feeding and spacing ring —58— is provided near its periphery with a circumferentially extending series of projections —62— and recesses —63— alternating with each other, said projections rising from the main body of the ring to form abutments for feeding the kernels of said corn one by one into registration with the outlet openings —57— while the spaces —63— are of sufficient circumferential length to permit the individual kernels to readily gravitate therein between the shoulders —62—.

The covering plate 60 which is located in the bottom of the hopper —46— has an annular marginal flange resting upon the upper face of the seed feeding ring —58— in close proximity to the inner sides of the projections —62— and serves the double purpose of holding the seed feeding ring against upward or lateral displacement and also causing the kernels of corn to gravitate more readily between the shoulders —62— or into the recesses —63— which are the only portions of the seed feeding ring exposed to the interior of the reservoir through the annular space between the outer marginal edges of the covering plate —60— and base of the reservoir —46—.

An ejector —65— is pivotally mounted within an enlarged portion of the cover plate —60— directly over or in alinement with the outlet opening —57— and also in alinement with the projections —62— and recesses —63— so as to trail upon the upper edges of said projections and is spring pressed into the intervening recesses —63— by a spring —66— to forcibly eject the kernels through the opening —57— into the upper end of the chute as the pockets or recesses —63— are successively registered with the discharge opening —57—.

In order to prevent the entrance of more than one kernel of corn into the pockets or recesses —63—, I provide a suitable brush or separator —67— which is pivoted at one end to the cover plate —60— and has its opposite end beveled and normally resting in close proximity to the upper edges of the shoulders or abutments —62— at one side of the opening —57—, said separator being yieldingly held in its normal position by a spring —68— to prevent clogging of this portion of the machine and also to more effectively separate the kernels one from the other.

Movable in the upper end of the chute —48— or rather in the outlet —57— is a cut-off valve —69— which is normally closed but adapted to be opened once during each revolution of the check shaft —4— by means of a cam or projection —70— on said shaft and a suitable lever —71— which is pivoted at one end at —72— to the plate —54— at one side of the check shaft —4— and has its opposite end connected with a lost motion to an arm —73— on the valve —69— at the opposite side of the check shaft as best seen in Fig. 4, said cam lever being provided on its underside with a projection —74— adapted to be engaged by the cam —70— for rocking the rear end of the lever —71— upwardly and thereby opening the valve and permitting it to close immediately after opening to permit the kernels of corn which have been held back by the valve —69— to gravitate into the chute —48—.

Pivotally mounted in the lower end of the chute or rather in the lower end of the extension —50— is an additional valve —75— which is normally closed to temporarily retain a predetermined number of kernels of corn in the chute but is adapted to be opened immediately upon the operation of the check shaft. For this purpose the check shaft 4 is provided with an additional cam tooth —76— for engaging one end of a lever —77— which is pivoted at —78'— to the rear side of the ring —54— and is provided with a pendant arm —78— for opening the valve —75— just before the opening of the upper valve —69— and allowing the corn held by the valve —75— in the lower end of the chute extension to gravitate into the furrow, said arm —78— also serving to operate a fertilizer controlling valve hereinafter described.

The valve —75— is pivoted at —80— to the chute extension —50— and is provided with a rearwardly projecting pin —81— in the path of movement of but normally spaced a short distance apart from the pendant arm —78— so as to allow the fertilizer valve 90 to be opened slightly in advance of the corn controlling valve to deposit the fertilizer in the bottom of the furrow just in advance of the corn deposit.

When the check shaft —4— is in its normal position of rest, the cam —76— is normally in close proximity to the underside of the rear end of the lever —77— so that at the initial operation of the check shaft by the engagement of the furcated arm —5— with one of the check stops on the wire —a—, the valve —75— will be opened to deposit the corn in the furrow and then immediately closed by means of a spring —82— as soon as the cam —76— passes the end of the lever —77—. As the check shaft continues to rotate, the cam —70— engages and operates the lever —71— to open the valve —69— in the upper end of the chute —48— to permit the corn held thereby to gravitate into the lower end of the chute where it is temporarily held by the valve —75—, said valve —69— being automatically closed by the weight of the lever —71— as soon as the cam —70— has passed its coacting cam —74— on the lever —71—.

Now as the check shaft continues one complete revolution during which the corn feeding plate —58— is rotated, an additional predetermined quantity of seed corn is fed into the upper end of the chute —48— where it is temporarily held by the valve —69— ready for repetition of the operation just described, thereby maintaining predetermined quantities of corn in the lower and upper ends of the chute —48— by means of the valves —75— and —69— respectively, it being understood that the valve —75— is opened and closed slightly in advance of the opening and closing of the valve —69— so as to allow the corn in the lower end of the chute to be deposited in the furrow while that which is deposited in the upper end of the chute is temporarily held by the valve —69— and is only allowed to gravitate into the lower end of the chute after the valve —75— is closed.

*Fertilizer feeding mechanism.*—In the bottom of the fertilizer reservoir —47— is a rotary feeding plate —84— which together with an agitator —85— are journaled centrally in the bottom of the reservoir and are operatively connected by gears —86— to the counter-shaft —7—, the agitator —85— serving to loosen the fertilizer while the feeding plate —84— serves to feed limited quantities into the chute —49—. A baffle or cut off plate —88— is arranged within the reservoir directly over the outlet as —89— in the bottom of the reservoir leading into the chute —49— for preventing the feed of excessive quantities of the fertilizer into said chute. A valve —90— is pivoted at —91— in the extension —51— at the lower end of the chute —49— and is provided with an upwardly extending arm —92— which is connected by a link —93— to a lever —94— at the rear of the extension —50— of the corn chute —48—. This lever —94— is pivoted at —95— to the lower end of the chute extension —50— and is provided at its upper end with a roller bearing —96— normally in contact with the front face of the pendant arm —78— of the lever —77—, said valve —90— being normally closed and adapted to be opened by the forward movement of the arm —78— as the lever —77— is operated by the cam tooth —76—.

The valve —90— is normally closed by a spring —98— but as previously stated is adapted to be opened slightly in advance of the corn controlling valve —75—, that is, there is a slight space between the rear end of the pin —81— of the corn controlling valve and front edge of the arm —79— while the roller —96— is normally in contact with said arm so that as the latter is moved forwardly it will first open the valve —90— and afterward open the valve —75— to allow the fertilizer to feed into the bottom of the furrow just in advance of the deposit of the corn.

When it is desired to use the machine for drilling the corn irrespective of the check wire, the arm —42— carrying the stop pin —41— is thrown out of the path of movement of the pendant arm —40— of the locking pawl —37— by means of the lever —44—, thus permitting the pawl —37— to remain in interlocking engagement with the ratchet wheel —36— to cause the check shaft to be driven continuously from the counter shaft —7— under which conditions the upper corn controlling valve —69— and its operating lever —71— may be held in their inoperative positions with the valve open by means of a detent —99— which is shown in Fig. 8 as adjustable at will to and from a position directly under the rear end of the lever —71— to hold the latter in its elevated position out of the path of movement of the cam —70— on the check shaft, said detent —99— being held in its adjusted position by means of a thumb screw or clamp —100—. Under the same conditions the valve —75— in the lower end of the corn chute —48— and also the fertilizer controlling valve —90— are held in their open positions and for this purpose I provide the upper end of the lever —94— with a loop or shoulder —101— adapted to be engaged by a detent —102— which is slidably mounted in the upper front portion of the chute supporting frame —24— and is adapted to be adjusted at will into interlocking connection with the loop or shoulder —101— for holding the lever —94— in its inactive position and thereby holding both of the valves —75— and —90— open. It is now apparent that in drilling the check shaft —4— and also the seed and fertilizer feeding mechanisms are operating continuously and at the same time the valves in the chutes —48— and —49— are open, thus allowing the corn and fertilizer to feed simultaneously into the furrow, the fertilizer chute being located slightly in front of the corn chute so as to deposit the fertilizer slightly in advance of the corn.

What I claim is:

In a check-row planter, a corn chute, a fertilizer chute, separate valves in said chutes, and an operating member connected to the fertilizer controlling valve and also connected to the corn controlling valve with a lost motion whereby the fertilizer valve is opened slightly in advance of the corn controlling valve.

In witness whereof I have hereunto set my hand on this 2nd day of May 1911.

WILLIAM E. GILROY.

Witnesses:
G. W. SEYBOLD,
JEROME B. GERMAN.